United States Patent
Hosmer et al.

(10) Patent No.: US 6,893,159 B1
(45) Date of Patent: May 17, 2005

(54) LUBRICATION FREE CONNECTION

(76) Inventors: Christopher Eugene Hosmer, 202 Ticonderoga Dr., Greer, SC (US) 29650; Anthony C. Medeiros, 621 Sweet Juliet Way, Greer, SC (US) 29650; Edward J. Mack, II, 11 Hope St., Bristol, RI (US) 02809

( * ) Notice: Subject to any disclaimer, the term of this patent is extended or adjusted under 35 U.S.C. 154(b) by 151 days.

(21) Appl. No.: 10/352,194

(22) Filed: Jan. 27, 2003

(51) Int. Cl.$^7$ ............................................. F16C 33/04
(52) U.S. Cl. ........................ 384/280; 384/295; 384/300
(58) Field of Search ............................... 384/280, 295, 384/300, 291, 299

(56) References Cited

U.S. PATENT DOCUMENTS

| | | | |
|---|---|---|---|
| 2,427,203 A * | 9/1947 | Essig | 384/280 |
| 2,778,066 A * | 1/1957 | Walmsley | 384/280 |
| 3,997,954 A * | 12/1976 | White | 384/300 |
| 5,017,095 A * | 5/1991 | Burgess et al. | 384/295 |
| 5,067,214 A | 11/1991 | Hosmer et al. | 26/89 |
| 5,613,284 A | 3/1997 | Hosmer | 26/89 |
| 5,797,172 A | 8/1998 | Hosmer | 26/89 |
| 6,183,137 B1 | 2/2001 | Kojima et al. | 384/297 |
| 6,478,468 B2 * | 11/2002 | McMeekin et al. | 384/279 |

* cited by examiner

*Primary Examiner*—Lenard A Footland
(74) *Attorney, Agent, or Firm*—Charles L. Schwab; Nexsen Pruett, LLC

(57) ABSTRACT

A tenter clip has a jaw pivot shaft having a pair of molded bearing surfaces of superior strength, wear resistance and stability under high temperature operating conditions. The method for manufacture of the jaw pivot shaft includes knurling recesses formed in the shaft prior to applying plastic bearing material to the recesses by injection molding and finishing machining the pin by centerless grinding.

3 Claims, 3 Drawing Sheets

LUBRICATION FREE CONNECTION

TECHNICAL FIELD

This invention relates to the construction of a self lubricating shaft or pivot pin suitable for operating at high temperatures such as in tenter frame apparatus.

BACKGROUND OF THE INVENTION

U.S. Pat. No. 5,067,214 issued Nov. 26, 1991 to Christopher E. Hosmer and John F. Whaley for a Tenter Framer Apparatus and Method shows a self-lubricating bushing made of a polyamide resin.

U.S. Pat. No. 5,797,172 issued Aug. 25, 1998 to Christopher Eugene Hosmer for a Tenter Frame and Method discloses tenter frame apparatus of the type in which this invention has particular application.

Conventional self lubricating friction or wear devices such as bushings and/or plain bearings are typically composed of a metal housing in which a plain plastic bushing is inserted and secured in a manner preventing rotation of the bushing. Typically a metal shaft is carried in the interior diameter of the bushing. In the case of a tenter frame clip jaw application the currently issued bushings result in the bushing locking down on the metal shaft due to thermal expansion and the bushing wears out prematurely or it locks up preventing the desired function of the jaw.

BRIEF SUMMARY OF THE INVENTION

Attachment of the self lubricating plastic bushing is achieved by insert injection molding, at high pressure and temperature, a thin, self lubricating plastic sleeve around the metal pin. To enhance adhesion and provide sufficient material for wear, the plastic is molded in a groove or recess of a specific depth which has a roughed up or knurled surface. The self lubricating bearing member is thus on the shaft which rotates in the metal housing. Thermal expansion at elevated temperature results in expansion of the internal diameter of the plastic sleeve; however, the roughed up surface prevents rotation of the plastic sleeve. Expansion of the plastic bearing sleeve is minimized by using a thin layer of plastic which has a low coefficient of thermal expansion.

The process by which the hybrid steel and plastic pin is produced is also unique and very cost effective. Although CNC turning of the hybrid pin to the desired outside diameter and dimensional tolerance is possible, a more cost effective and dimensionally and surface finish superior part is produced by centerless grinding the outside diameter. The process of centerless grinding metal and plastic simultaneously is unique and requires a plastic that is dimensionally stable and rigid enough to grind properly and not melt and smear or have metal particles in-bedded.

A polytetraflouraethylene is preferred for use in tenter frame jaw pins for its physical, thermal and tribological properties which are required to achieve a long wearing, stable product with reliable performance.

BRIEF DESCRIPTION OF THE DRAWINGS

One embodiment of the invention is illustrated in the drawings in which.

DETAILED DESCRIPTION OF THE INVENTION

Figure 1:
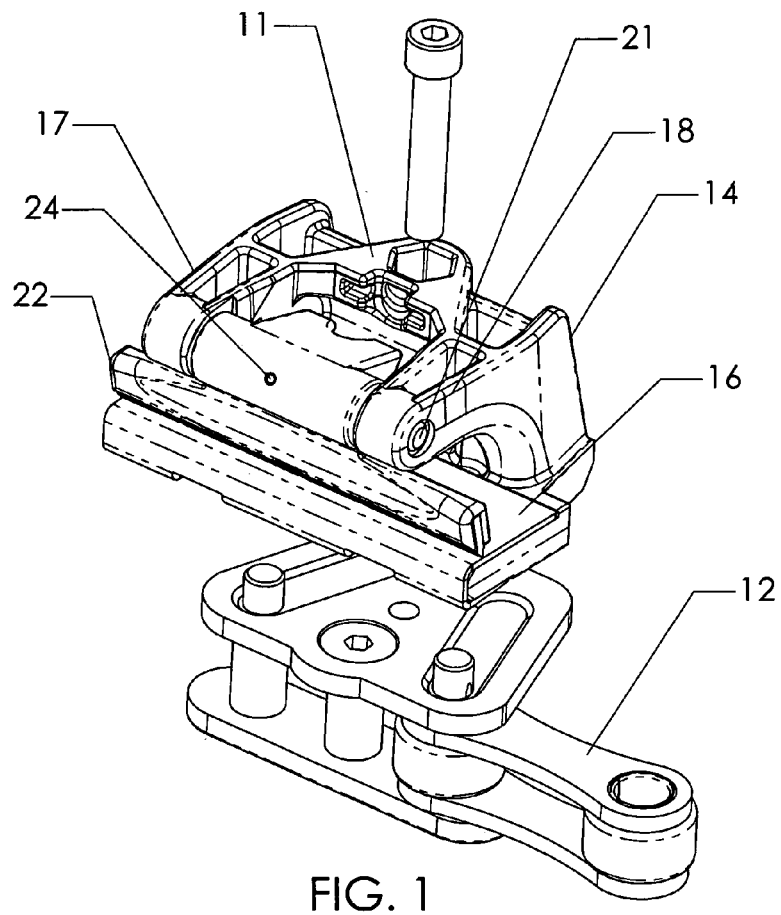
FIG. 1 is a perspective view of a tenter frame with parts separated and broken away for illustration purposes.
Figure 2:
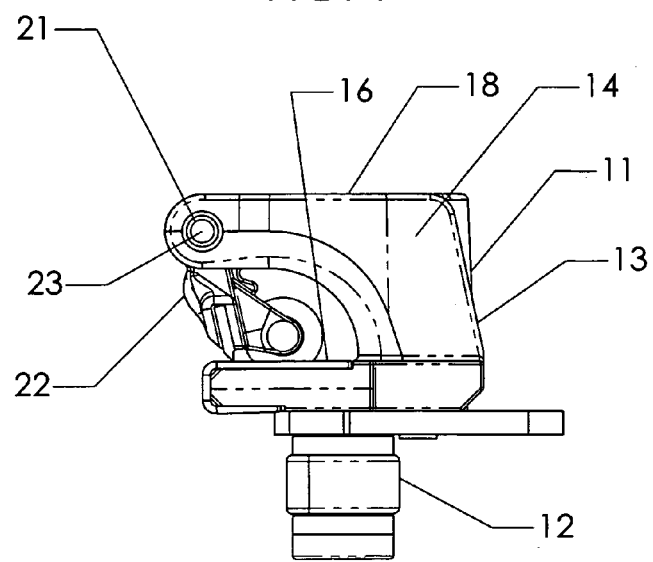
FIG. 2 is an end view of the tenter frame in an assembled condition.

Referring to FIGS. 1 and 2, the invention is illustrated in a tenter clip 11 which with other clips, are connected in series by a link chain 12 thus providing a tenter chain 13. Tenter chains are provided in opposing pairs to grip the edge of a continuous web of flat material such as woven cloth and to simultaneously stretch the material in a transverse direction while conveying it through a process oven as a finishing operation to its manufacture.

The tenter clip 11 is a clamping device which includes a clip body 14 which is open on one side with a surface 16 for supporting web material being fed into it. The clip body 14 includes a pair of support arms 17, 18 pivotally supporting a pivot pin 21 for a jaw 22. The pivotable jaw 22 is operated by an external mechanism, not shown, to allow entry and exit of the web material. The jaw 22, and the clip 11, are designed to automatically clamp and hold the web material. The jaws movement is a limited pivotal movement about the axis 23 of the jaw pivot pin 21 which is nonrotatably secured to the jaw 22 by a transverse pin 24 extending through aligned bores in the pin 21 and the jaw 22.

Referring to FIGS. 3–7 the process for manufacture of the jaw pivot pin 22 is illustrated by showing the steps of manufacture.

Figure 3:
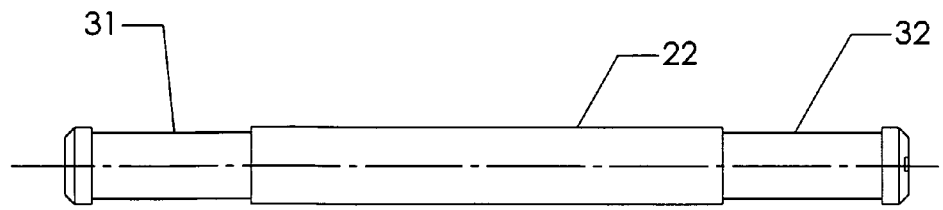
FIG. 3 is a side view of a metal pivot shaft initially machined to provide two reduced diameter recesses.

FIG. 3 shows the pin 22 after the pin is rough finished to a predetermined oversize diameter and a pair of reduced diameter recesses 31, 32 are formed near its axially opposite ends. The recesses 31, 32 having an axial dimension matching the bearing surfaces of the arms 17, 18 of the tender clip 11.

Figure 4:
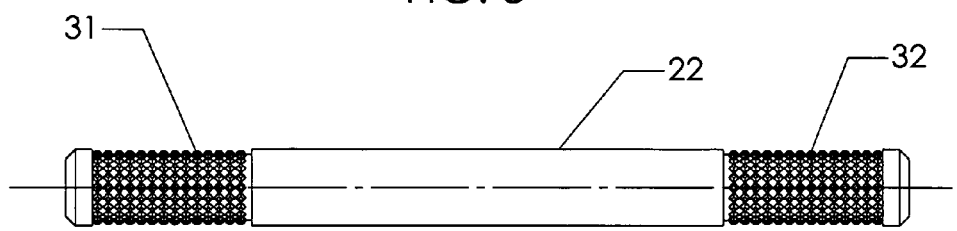
FIG. 4 is a side view of the shaft after the recessed areas of the shaft have been knurled.

FIG. 4 shows the pin 22 after the reduced diameter surface of the recesses 31, 32 have been knurled.

Figure 5:
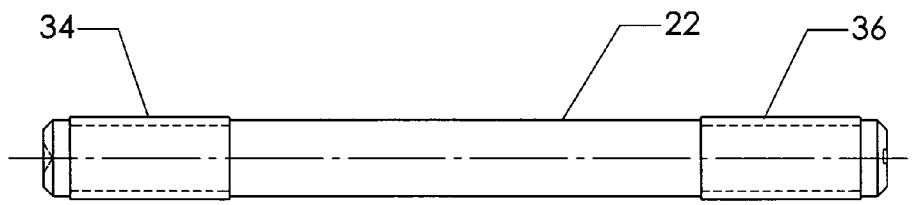
FIG. 5 is a side view of the shaft after a plastic material has been applied to the recessed areas by injection molding.
Figure 6:
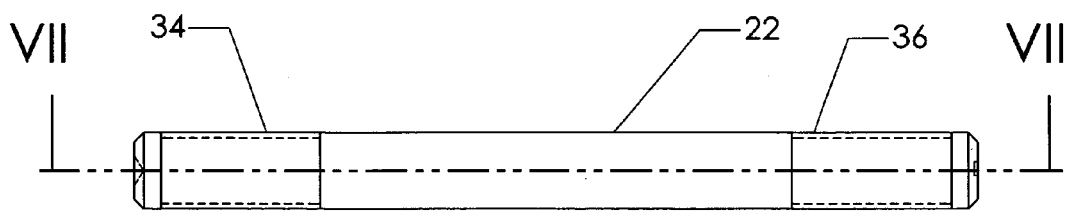
FIG. 6 is a side view of the shaft after it has been machined by centerless grinding.
Figure 7:
FIG. 7 is a section view taken along the line VII—VII in FIG. 6.

FIG. 5 shows the pin 22 after sleeves 34, 36 of high temperature resistant plastic, such as polytetraflouraethylene has been applied by injection molding to the reduced diameter areas 31, 32 of the pin 22. The oversized pin 22 is next machined by centerless grinding to a desired finished diameter as illustrated in FIGS. 6 and 7.

Figure 8:
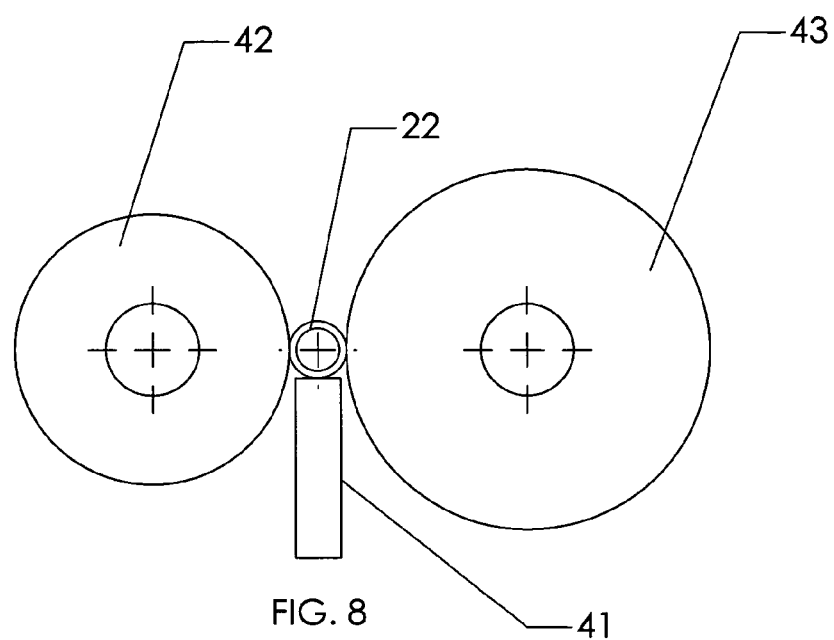
FIG. 8 is a side view of a centerless grinding apparatus.
Figure 9:
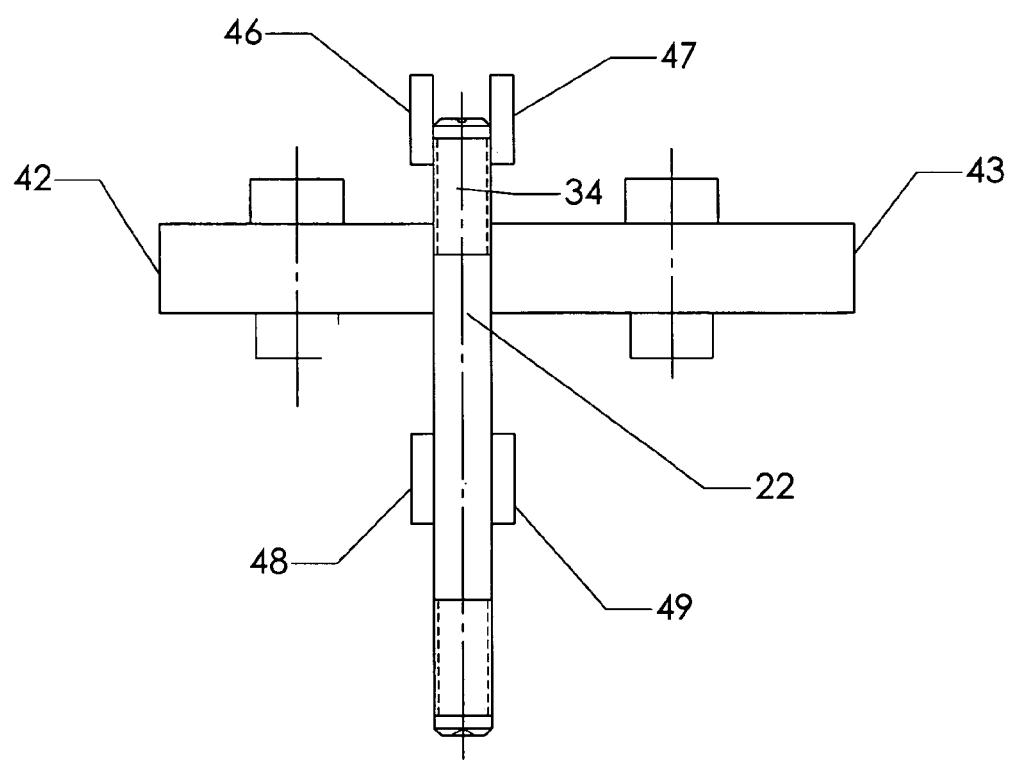
FIG. 9 is a top view of the apparatus shown in FIG. 8.

FIGS. 8 and 9 illustrate the centerless grinding step. The shaft 22 is supported by a work blade 41 and is sandwiched between a grinding wheel 42 and a regulating wheel 43. As shown in FIG. 9 the pin 22 is guided by work rest guides 46, 47, 48, 49 during a machining operation.

PRACTICAL APPLICATION OF THE INVENTION

This application has particular application in stenter clips which are connected in series by a chain to form a tenter chain. Tenter chains are used in opposing pairs to grip opposite edges of a continuous web of flat material, such as a woven cloth, and simultaneously stretch the material in opposite directions while conveying it through a relatively high temperature process oven as a finishing operation in the manufacture of the processed material.

Wear on the bearing surfaces has long been a problem in tenter clip design because lubrication of the bearing surfaces is impractical, mainly because the bearing surfaces are above the web material and it is virtually impossible to lubricate the bearing surfaces without lubrication spilling onto the web material. Since these bearing surfaces are typically not lubricated, they are made of metal which resists high temperature and are expected to wear significantly. Frequent repair of the clip is required to keep the clips within operating tolerances. The repair of some clip designs require reboring the pivot pin hole and a new larger diameter pivot pin. The repair of clips using replaceable steel bushing are repaired by replacing the bushing and it is often to replace the pin as well.

Various plastic materials with improved strength and wear characteristics and the ability to withstand high temperature have been developed. They have been tried and tested with limited success. Very close tolerances are necessary for proper operation of a tenter clip. Steel bushings for tenter clips are commonly ground on their outside diameter and honed on their inside diameter to achieve the required tolerances. It is difficult and expensive to obtain these desired tolerances with plastic bushings. Most plastic materials have a much higher coefficient of thermal expansion than metals used in tenter clip components. This tends to cause the bushings to lose clearance and lock on the pin preventing rotation. Increasing the cold clearance solves this problem but creates manufacturing and functional problems.

The normal method of installation of bushings is by interference press fit. Plastic bushings tend to deform when press fit, thereby losing most of the interference press fit holding ability. This allows rotation and or axial movement of the bushing, which is unacceptable.

The tenter pin of this invention solves all the beforementioned problems in a cost effective manner. Tolerances are not a problem because the plastic bearing material is molded into a groove or recess in the pin and the pin and the plastic inserts are centerless ground as a unit. By molding the plastic into a recess with a knurled bottom surface the plastic insert is restrained from rotation and axial movement relative to the pin. Thermal expansion of the plastic insert is minimized because the plastic insert is radially thinner than that of a stand alone plastic bushing. By forming the thin plastic bearing in recesses in the pin, the pin and inserts can be centerless ground as a unit to a final diameter. This facilitates manufacture and pin installation.

What is claimed is:

1. A bearing for a shaft component pivotally connecting a support component to a supported component, comprising:
   smooth radially confronting cylindrical surfaces on said components,
   a shallow annular recess formed in one of said cylindrical surfaces said recess presenting a rough radially facing surface, and
   a layer of self lubricating plastic pressure molded into said recess, said thin layer of plastic presenting one of said smooth cylindrical bearing surface in bearing engagement with the other of said cylindrical surfaces.

2. The bearing of claim 1 wherein said smooth cylindrical bearing surface on said layer of plastic faces radially outward.

3. A pivot connection between a shaft and a pair of axially spaced supports comprising:
   a pair of aligned radially inward facing cylindrical surfaces on said supports;
   a pair of radially outward facing cylindrical surfaces on said pin in confronting relation to said radially inward facing cylindrical surfaces
   a recess formed in each of one of said pairs of cylindrical surfaces, said recesses presenting a roughed up surface and
   a cylindrical layer of self lubricating plastic molded in said recesses presenting cylindrical bearing surfaces in radially confronting and bearing engagement with the other of said pairs of cylindrical surfaces.

\* \* \* \* \*